United States Patent [19]
Oglesbee et al.

[11] 3,861,758
[45] Jan. 21, 1975

[54] ADAPTIVE BRAKING SYSTEM

[75] Inventors: John W. Oglesbee; Gale F. Krawczak; Laurence D. Leadbetter, all of Elyria, Ohio

[73] Assignee: The Bendix Corporation, South Bend, Ind.

[22] Filed: Sept. 25, 1973

[21] Appl. No.: 400,574

[52] U.S. Cl. .................................. 303/21 P, 303/20
[51] Int. Cl. .............................................. B60t 8/08
[58] Field of Search ....... 188/181; 244/111; 303/20, 303/21; 307/10 R; 317/5; 324/161–162; 340/52 R, 53, 262–263

[56] References Cited
UNITED STATES PATENTS

| | | | |
|---|---|---|---|
| 2,944,773 | 7/1960 | Highley | 244/111 |
| 3,499,689 | 3/1970 | Larp et al. | 303/21 P |
| 3,578,819 | 5/1971 | Atkins | 303/21 BE |
| 3,790,227 | 2/1974 | Dozier | 303/21 P X |
| 3,791,701 | 2/1974 | Riordan | 303/20 X |

*Primary Examiner*—George E. A. Halvosa
*Assistant Examiner*—Stephen G. Kunin
*Attorney, Agent, or Firm*—Ken C. Decker; William N. Antonis

[57] ABSTRACT

An adaptive braking system for an automotive vehicle is disclosed. The system is adapted to simultaneously control both wheels mounted on a common axle by a single modulating device and control unit. The system includes circuitry which generates a signal which approximates vehicle velocity, and three distinct modes of operation are possible depending upon the vehicle velocity and upon the rotational velocity of the wheels on the axle. The primary mode is operational when both of the wheels are rotating at a rotational velocity greater than some predetermined low reference level and the vehicle velocity is greater than a predetermined reference level. the unbalanced mode occurs when the vehicle is travelling at a velocity greater than another predetermined reference level and one of the wheels is rotating at a rotational velocity greater than a corresponding predetermined reference level and the other wheel is rotating at a rotational velocity less than the corresponding reference level. The secondary mode of operation occurs when the vehicle velocity is greater than the another predetermined reference level and both of the wheels are rotating below their corresponding reference levels. The three modes provide adaptive control in vehicle brakes under all road surface and velocity conditions, while permitting the system to terminate operation when the vehicle is stopped.

13 Claims, 4 Drawing Figures

ADAPTIVE BRAKING SYSTEM

BACKGROUND OF THE INVENTION

This invention relates to adaptive braking systems for automotive vehicles.

Many adaptive braking systems for vehicles having fluid pressure operated brakes have been proposed. In order to be commercially successful, any adaptive braking system must provide effective control of the vehicle's brakes regardless of the coefficient of friction of the road surface, and regardless of the velocity at which the vehicle is travelling. Furthermore, the adaptive braking system must "cut out" or terminate at some predetermined low vehicle velocity, so that the vehicle may be stopped. Wheel speed information is not generally usable in itself to determine vehicle velocity, since under some surface conditions the wheels may lock while the vehicle is still travelling at an appreciable velocity, thereby resulting in a vehicle skid if adaptive control has already terminated. Therefore, it is necessary to provide a separate low wheel speed mode of operation of the adaptive braking system in addition to the primary mode which occurs when both wheels are rotating freely. This low speed mode of operation must also be sensitive to vehicle velocity, in order to terminate adaptive control of the vehicle's brakes when the vehicle has decelerated to a stop. Furthermore, adaptive braking systems must also accommodate a situation in which one wheel on a common axle is rotating at a rather high speed while the other wheel, due to a split surface coefficient, is close to lock. Of course, it would be possible in this situation to provide separate modulators and electronic control units in each wheel, but this is quite costly.

SUMMARY OF THE INVENTION

Therefore, an important object of our invention is to provide an adaptive braking system having a single modulator and control unit to control all the brakes mounted on the common vehicle axle.

Another important object of our invention is to provide an adaptive braking system which is operable in three distinct modes, depending upon vehicle velocity and the relationships of the wheel rotational velocities.

Another important object of our invention is to provide an adaptive braking system having a separate low wheel speed mode in which the system exhausts braking pressure when the wheels are close to lock and the vehicle is still travelling at an appreciable velocity, but which terminates adaptive control of the vehicle's brakes if the vehicle is close to stopping.

Still another important object of our invention is to provide an adaptive braking system that accounts for the situation in which one wheel on a common axle is rotating at an appreciable velocity and the other wheel is close to lock, due to a split surface coefficient.

DETAILED DESCRIPTION

Figure 1:
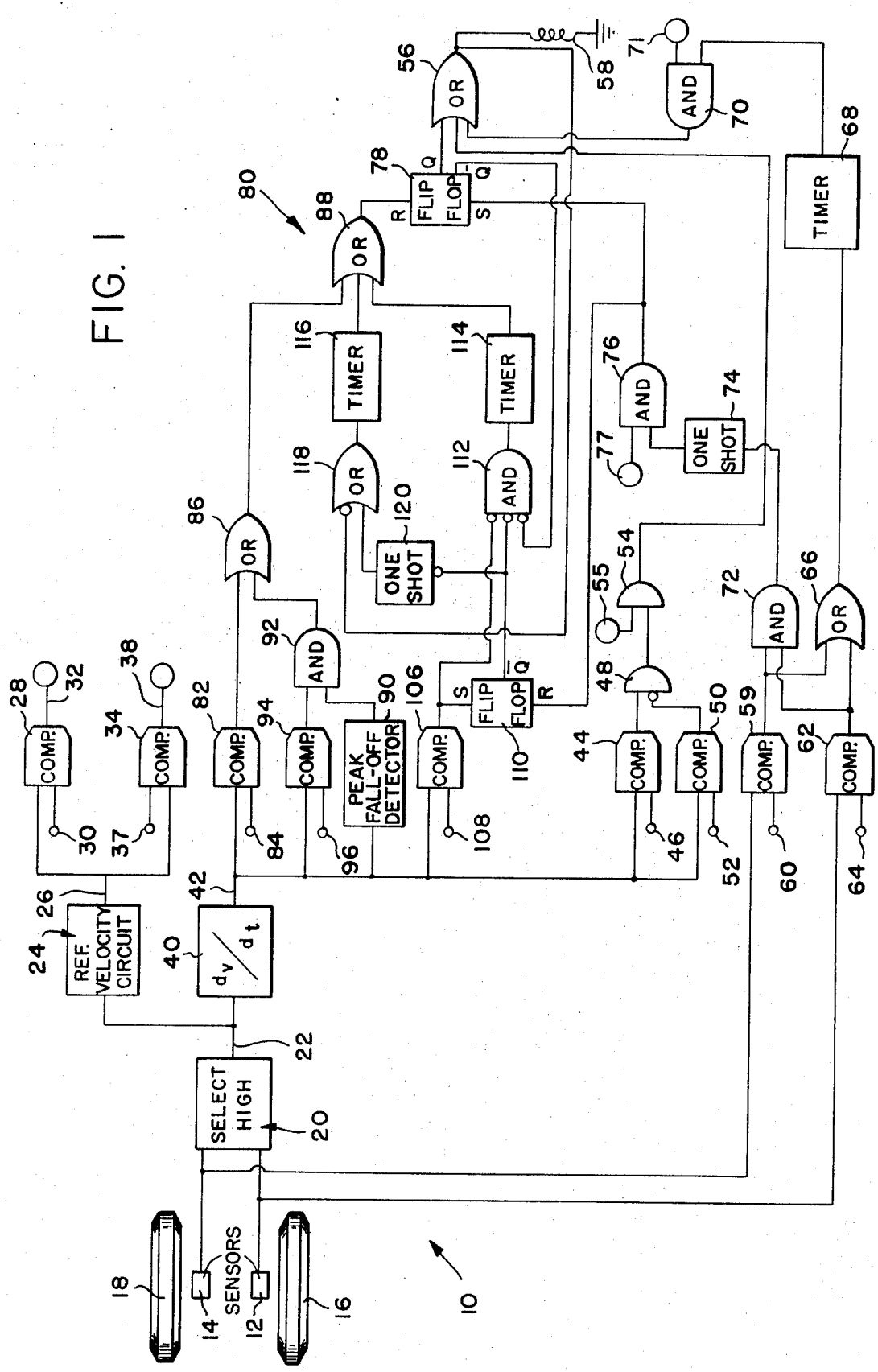
FIG. 1 is a functional block diagram of adaptive braking system made pursuant to the teachings of our prevent invention.

Referring now to the drawings, an adaptive braking system generally indicated by the numeral 10 includes a pair of wheel speed sensors 12 and 14 which are adapted to generate electrical signals proportional to the rotational velocity of corresponding wheels 16 and 18, which are mounted on a common axle. The signals generated by the wheel speed sensors 12 and 14 are transmitted to selecting circuitry generally indicated by the numeral 20, which selects the signal representing the speed of the faster rotating wheel and transmits this signal to its output terminal 22 of the selecting circuitry 20. The selecting circuitry 20 is of a type well known to those skilled in the art, and will not be disclosed in detail herein. For example, selecting circuitry 20 may be of the type disclosed in U.S. Pat. No. 3,535,004, owned by the assignee of the present invention and incorporated herein by reference. The signal on terminal 22 is transmitted to the input terminal of a reference velocity circuit generally indicated by the numeral 24. The reference velocity circuitry processes the signal generated by the select high circuitry 20 to provide a signal on the output terminal 26 thereof which substantially approximates the velocity of the vehicle. Details of the circuitry of the reference velocity circuit 24 will be described hereinafter. One terminal of a comparator 28 is connected to the terminal 26, and the other terminal of comparator 28 is connected to a reference velocity signal 30, which remains constant regardless of the value of the signal on the terminal 26. The comparator 28 compares the value of the signal on the terminal 26 with the reference value 30 and generates an output signal on the output terminal 32 of the comparator 28 when the value of the signal comparator of the terminal 26 exceeds the reference value on the terminal 30. One input terminal on a second comparator 34 is connected to the terminal 26 of the circuitry 24, and the other terminal of comparator 34 is connected to another reference velocity level 37, which again, remains constant irrespective of variations in the value of the signal on the terminal 26. However, the reference value 37 represents a much lower velocity than does the reference value 30. When the value of the signal on the terminal 26 exceeds the value of the reference level 37 the comparator 34 generates an output signal on its output terminal 38.

The signal representing the value of the faster rotating wheel which is generated on the output terminal 22 of the select high circuitry 20 is also transmitted to a differentiator generally indicated by the numeral 40. The differentiator circuitry is similar to other types of differentiator circuitry well known to those skilled in the art and is adapted to be responsive to the signal on the terminal 22 to produce a signal on output terminal 42 which is proportional to the acceleration and deceleration of the faster rotating wheel. The signal representing acceleration and deceleration of the faster rotating wheel on the terminal 42 is transmitted to one input terminal of a comparator 44. The other input terminal of the comparator 44 is connected to a reference value 46 which is proportional to some predetermined low deceleration value of the deceleration signal. The comparator 44 compares the value of the deceleration signal with the reference value and generates an output signal when the value of the deceleration signal becomes less than the reference value 46. This signal is transmitted to one input of an AND gate 48. One input terminal of another comparator 50 is also connected to the terminal 42, and the other terminal of comparator 50 is connected to a reference deceleration signal represented by the numeral 52. The reference level represented by the numeral 52 is somewhat higher than the reference value 46. The comparator 50 compares the value of the deceleration signal with the reference value represented by the numeral 52, and generates an output signal when the value of the deceleration signal on the terminal 42 becomes greater than the reference value 52. The output of the comparator 50 is inverted and is then transmitted to another input of the AND gate 48. Therefore, the AND gate 48 will produce an output signal when the value of the wheel decleration drops below the reference level 46, and the output of the AND gate 48 will terminate when the value of the deceleration signal is greater than the reference value 52. The output of the AND gate 48 is transmitted to one terminal of another AND gate 54, the other terminal 55 of which is connected to the output terminal 32 of the comparator 28. Therefore, AND gate 54 will produce an output signal only when the value of the wheel deceleration signal is less than the reference level 46 and the signal generated by the reference velocity circuit 24 is greater than the reference value 30. The output of the AND gate 54 will terminate when the deceleration signal increases so that it becomes greater than the reference level 52, or when the value of the output signal generated by reference velocity circuit 24 drops below the reference level 30. The output signal of the AND gate 54 is defined as the primary mode signal and is transmitted through an OR gate 56 to actuate a solenoid valve 58. Solenoid valve 58 is part of a brake pressure modulator of the type well known to those skilled in the art, such as, for example, that shown in copending U.S. Pat. application Ser. No. 199,109, filed Nov. 16, 1971, now abandoned owned by the assignee of the present invention and incorporated herein by reference. When solenoid valve 58 is actuated, a brake pressure decay is effected.

The signal generated by the wheel sensor 14 is also transmitted to one input of a comparator 59. The other input of the comparator 59 is connected to a reference velocity value 60. The comparator 59 produces an output signal when the value of the signal generated by the wheel speed sensor 14 drops below the reference value 60. Similarly, the signal generated by the wheel speed sensor 12 is transmitted to one input terminal of another comparator 62. The other input terminal of comparator 62 is connected to a reference velocity level indicated by the numeral 64. When the value of the signal generated by the wheel speed sensor 12 drops below the reference value 64, the comparator 62 generates an output signal. The output signals of the comparators 59 and 62 are transmitted to separate input terminals of an OR gate 66. Therefore, if either or both of the signals generated by the wheel speed sensors 12 and 14 have a value less than the corresponding reference values 60, 64, the OR gate 66 will generate an output signal which actuates a timer mechanism 68. The timer mechanism 68 inhibits the output signal of the OR gate 66 after a predetermined time period has elapsed. The output of the timer mechanism 68 is also transmitted to one input terminal of an AND gate 70. The other input terminal 71 of the AND gate 70 is connected to the terminal 38 of the comparator 34. Therefore, the AND gate 70 will generate a signal only if the value of the signal on the terminal 26 of the reference velocity circuit 24 is greater than the reference velocity 37 before the signal from the OR gate 66 is terminated by timer 68. The output signal of the AND gate 70 is defined as the unbalanced mode signal and is fed through the OR gate 56 to actuate the solenoid 58. The signal from the AND gate 70 is terminated when the timer 68 times out, when the value of the signal on the terminal 26 drops below the value of a reference velocity 37, or when both of the signals sensed by the wheel speed sensors 12 and 14 rise above their corresponding reference levels 60 and 64.

Output terminals of the comparators 59 and 62 are also fed into separate input terminals of another AND gate 72. Therefore, when the value of the signals generated by both of the speed sensors 12 and 14 drop below the values of their corresponding reference levels 60 and 64, AND gate 72 will generate an output signal which fires the one-shot 74. The output of the one-shot 74 is transmitted to one input of an AND gate 76, the other input 77 of which is connected to the terminal 38 of the comparator 34. Therefore, the AND gate 76 will generate a pulsed output when the values of both of the speed sensors 12 and 14 drop below their corresponding references 60 and 64 and the value of the signal on the terminal 26 of the reference velocity circuit 24 exceeds the reference value 37. The output of AND gate 76 sets the secondary mode flip flop 78. The output of the flip flop 78 is defined as the secondary mode signal and is fed through the OR gate 56 to actuate the solenoid 58 and thereby effect a brake pressure decay. The secondary mode flip flop 78 is reset by circuitry generally indicated by the numeral 80. Obviously, the secondary mode flip flop 78 will be set only when the vehicle speed is above its reference level and both wheels are close to lock, thereby indicating a very serious incipient skidding condition. When this condition occurs, it is desirable to decay brake pressure for a sufficient time until the wheels have again recovered to become substantially synchronous with vehicle velocity. The purpose of circuitry 80 is to detect when the rotational velocity of the faster rotating wheel is substantially synchronous with vehicle speed, and therefore, when it is safe to terminate the brake pressure decay and initiate a brake pressure increase. The circuitry 80 includes several tests to determine when the faster rotating wheel is rotating substantially synchronous with vehicle velocity.

The circuitry 80 includes a comparator 82 having an input terminal connected to terminal 42 and another terminal connected to a reference acceleration value generally indicated by the numeral 84. When the value of the signal on the terminal 42 exceeds the reference value 84, the comparator 82 generates an output signal which is fed through OR gate 86 to the reset terminal of the flip flop 78, and thereby extinguishes the secondary mode signal to terminate the brake pressure decay. It should be noted that the reference level 84 represents a relatively high acceleration level. The acceleration signal generated on the output terminal 42 of the differentiator 40 is also transmitted to the input terminal of a peak fall-off detector 90. The peak fall-off detector 90 is of conventional construction well known to those skilled in the art and is designed to sense a maximum value of the acceleration signal, and then generate an output signal when the value of the acceleration signal has decreased a predetermined amount from that peak value. Since the construction of the peak fall-off detector 90 is completely conventional, it will not be described in detail herein. The output of the peak fall-off detector 90 is transmitted to one of the inputs of the AND gate 92. The other input of the AND gate 92 is connected to the output of a comparator 94. One of the input terminals of the comparator 94 is connected to the output terminal 42, and the other terminal of the comparator 94 is connected to a reference level generally indicated by the numeral 96, which is proportional to a substantially zero value of the acceleration signal. Therefore, when the value of the acceleration signal on the terminal 42 of the differentiator 40 is above zero, the comparator 94 generates an output signal. The AND gate 92 will generate an output signal only after the value of the acceleration signal has decreased the predetermined amount from its maximum value and only if the value of the acceleration signal is still greater than zero. The output of the AND gate 92 is transmitted to the reset terminal of the flip flop 78 through the OR gates 86 and 88.

Of course, the purpose of the circuitry 80 is to terminate the secondary mode signal as soon as the high speed wheel has recovered sufficiently that it is rotating substantially synchronous with the vehicle. For example, if the wheel is accelerating at a rate sufficient to exceed the reference value 84, it may be assumed that the wheel will soon be operating synchronous with vehicle velocity and the secondary mode is terminated. Similarly, when the wheel acceleration has decreased from its peak value a sufficient amount to generate an output signal from the peak fall-off detector 90, it is assumed that the wheel was rotating synchronous with the vehicle velocity when it attained its peak value, and the subsequent decrease in wheel acceleration was due to the fact that the vehicle itself was slowing down. However, in certain situations, such as operation of the vehicle on extremely slippery surfaces, no well-defined peak value of the acceleration signal may be attained. For example, referring now to the uppermost graph of FIG. 2, the portion 98 of the graph represents wheel acceleration due to the brake pressure decay initiated by the secondary mode signal. After brake pressure has been decayed for a sufficient time, the value of the wheel acceleration signal may oscillate at a slightly positive acceleration level, as indicated by the portion of the graph indicated by the numeral 100 in FIG. 2. It will be noted that no well-defined peak is attained, and the acceleration signal merely oscillates at some slightly positive acceleration level, and may, in fact, dip briefly below zero acceleration, as indicated by the portion of the curve of 102 in FIG. 2. Finally, however, the wheel will again begin to decelerate, as indicated by the portion of the curve 104 in FIG. 2, and at this time it may be assumed that the wheel is again rotating substantially synchronous with vehicle velocity. But since no well-defined peak was attained during the portion 100 of the curve, and since the value of the acceleration signal never reached the reference value 84, both the comparator 82 and the peak fall-off detector 90 are ineffective to terminate the secondary mode under these conditions, even though the wheel has recovered to be rotating substantially synchronous with vehicle speed. To detect the condition of the acceleration signal indicated by the numeral 104 on FIG. 2, one terminal of a comparator 106 is connected to the output terminal 42 of differentiator 40, and the other terminal of comparator 106 is connected to a reference level which has a value of slightly greater than zero acceleration, and is represented by the line 108 in the uppermost graph of FIG. 2. The comparator 106 generates an output signal whenever the value of the acceleration signal is greater than the reference value 108. Therefore, the output of the comparator 106 will become high when the value of the acceleration signal is greater than the reference level 108 and will go low when the value of acceleration signal is less than reference level 108. The value of the signal on the output terminal of the comparator 106 is represented by the curve B in FIG. 2. The output of the comparator 106 sets a flip flop 110 when the value of the acceleration signal initially increases above the value of the reference level 108. The output of the comparator 106, and the $\overline{Q}$ output of the flip flop 110 are inverted and transmitted to different terminals of the AND gate 112. The other terminal of the AND gate 112 inverts the output of the $\overline{Q}$ terminal of the flip flop 78, and therefore a signal is always present on this terminal as long as the flip flop 78 is set. As noted in Curve C of FIG. 2, the $\overline{Q}$ output of flip flop 110 is initially high, but when the value of the acceleration signal initially crosses above the reference level 108, the $\overline{Q}$ output of the flip flop 110 goes low and remains low until the flip flop 110 is reset. This occurs only wnen the AND gate 76 produces an output signal, and therefore, occurs only when the flip flop 78 is set initially. When the secondary mode signal is terminated, the connection between the $\overline{Q}$ output of flip flop 78 and the input terminal of the AND gate 112 insures that the output of the AND gate 112 will go low upon termination of the secondary mode. Therefore, AND gate 112 generates an output signal whenever the value of the acceleration signal drops below the reference level 108 after it initially increases to a value higher than this reference level 108, as indicated by curve D on FIG. 2. The output signal from the AND gate 112 actuates the timing mechanism 114, which generates an output signal a predetermined time period after the output signal from the AND gate 112 is generated. However, if the output signal from the AND gate 112 terminates within the timer period, the timer 114 is reset, and consequently, output signals from the AND gate 112 of a duration less than the period of the timer 114 are ignored.

Figure 2:
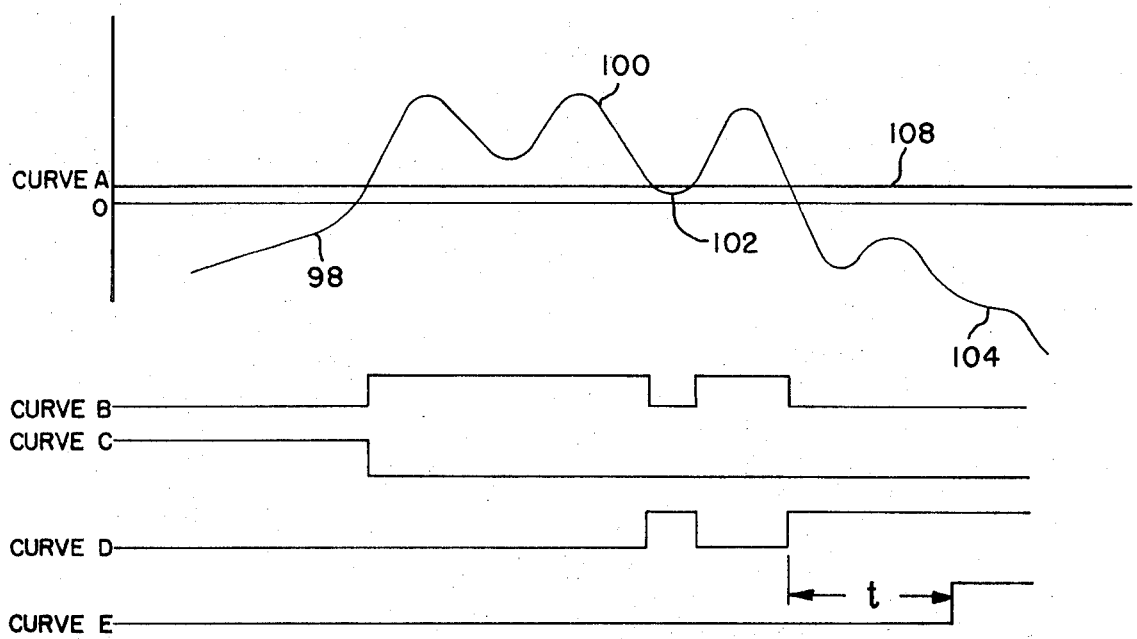
FIG. 2 is a graphical illustration of the operation of the system in the secondary mode.

Curves D and E in FIG. 2 represent the output signals generated by the AND gate 112 and timer 114, respectively. As indicated in these curves, when the value of the acceleration signal drops briefly below the reference level 108, as indicated by the portion 102 of the curve A of FIG. 2, the AND gate 112 produces an output signal, but no output signal is generated by the timer 114. Only after the AND gate has generated a signal for the timer period does the timer generate an output signal, as indicated in Curve E of FIG. 2. The output signal from the timer 114 is transmitted through OR gate 88 to the reset terminal of the flip flop 78, thereby extinguishing the secondary mode signal. To assure that the secondary mode will not last indefinitely, another timer mechanism generally indicated by the numeral 116 is provided. The period of the timer 116 is substantially longer than the period of the timer 114, so that the secondary mode will normally be terminated by the timer 114, or the peak fall-off detector 90 and the comparator 82. The output of the timer 116 is transmitted through the OR gate 88 to the reset terminal of the flip flop 78. The input terminal of the timer 116 is connected to the output terminal of another OR gate 118.

The timer 116 is reset by a high voltage level at its input terminal, and a low voltage level on the input terminal of the timer 116 starts the timer running. One of the terminals of the OR gate 118 is connected to the inverted output of the OR gate 56, and the other terminal of the OR gate 118 is connected to the output of a one-shot 120. One-shot 120 is fired when the flip flop 110 is set. Therefore, the timer 116 will be reset when the output signal from OR gate 56 terminates, thereby terminating the brake pressure decay. The timer will start running when another brake pressure decay is initiated, and consequently, the OR gate 56 generates another output signal. The timer 116 is also reset during a brake pressure decay by the one-shot 120 when the value of the acceleration signal initially increases above the reference level 108. This permits the timer 114 to terminate the secondary mode signal, but if the timer 114 does not produce an output signal for the period of the timer 116 after the latter has been reset by the one-shot 120, the timer 116 will itself reset the flip flop 78. This failsafe feature insures that the solenoid valve 58 will not remain on for long periods of time due to either a malfunction in the system or because the value of the acceleration signal does not decrease below the reference level 108 within an acceptable time period.

Figure 3:
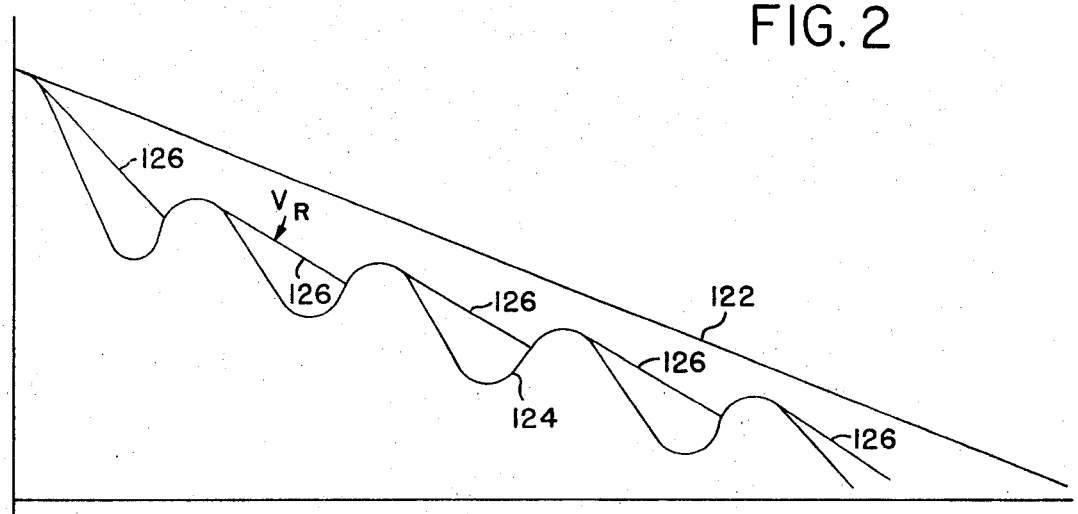
FIG. 3 is a graphical illustration of the reference velocity tracking circuit used in the adaptive braking system made pursuant to the teachings of our invention.
Figure 4:
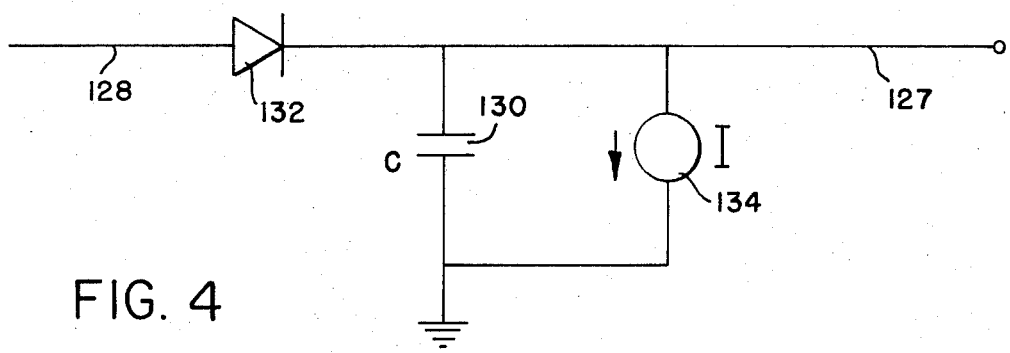
FIG. 4 is an electrical schematic of a reference velocity tracking circuit used in our invention.

Referring now to FIGS. 3 and 4, details of the construction and operation of the reference velocity circuit 24 will be described. FIG. 3 is a graphical representation of the relationship between vehicle velocity, indicated by the line 122 in FIG. 3; wheel velocity, indicated by the curve 124 in FIG. 3, and the output signal of the reference velocity circuit 24 indicated by lines 126 in FIG. 3. As can be seen in FIG. 3, the vehicle velocity represented by the line 122 decreases linearly during a stop. However, due to the fact that braking pressure is being decayed and then rebuilt by operation of the solenoid 58 during adaptive controls of the vehicle's brake, wheel speed will oscillate in the manner illustrated by the curve 124. The reference velocity circuit 24 is responsive to the peak values of the oscillations of the curves 124 to generate a signal which decays at a substantially constant rate from these peak values as indicated by the lines 126 in FIG. 3. As can be seen by examining FIG. 3, each of the lines 126 are roughly parallel to the corresponding segments of the line 122, and therefore the lines 126 are approximately proportional to the vehicle velocity during time periods when the value of the wheel speed signal is decreasing. Thus, the reference velocity circuit by generating the signals 126, generates a signal which is approximately proportional to vehicle velocity. Referring now to FIG. 4, te reference velocity circuit includes an input terminal 128 which is connected to the output terminal 22 of the selecting circuitry 20. The signal on the terminal 128 is used to charge a capacitor generally indicated by the numeral 130 which is connected between the terminal 128 and ground. Therefore, as long as the magnitude of the signal generated by the selecting circuit 20 increases, the charge on the capacitor 130 will also increase. However, when the value of the signal transmitted to the terminal 128 decreases, a diode 132 prevents discharge of the capacitor 130 through the terminal 128. Therefore, the sole discharge path of the capacitor 130 is through a current source 134 which is connected in parallel with the capacitor 130. Discharge of the capacitor 130 through the current source results in a linear discharge of the capacitor. Therefore, the signal generated on the output terminal 127 of the circuit 24 will decay linearly from the maximum value of the input signal on the terminal 128. The output signal on the terminal 127 of the circuit 24, as stated hereinabove is represented by the line 126 in FIG. 3.

MODE OF OPERATION

Assuming that both of the wheels 16 and 18 are rotating faster than the value represented by the reference levels 60 and 64, differentiator 40 generates a signal proportional to the acceleration and deceleration of the faster rotating wheel. This signal is compared to the acceleration level represented by reference level 46 by comparator 44, and when the value of the signal drops below this reference level comparator 44 generates an output signal, which is transmitted through AND gate 48 to the AND gate 54. The signal from AND gate 48 will terminate when the acceleration signal increases above the reference level 52. AND gate 54 generates an output signal when the value of the deceleration signal drops below the reference level 46, if the value of the signal on the output terminal 26 of the reference velocity circuit 24 is greater than the reference value 30 on the terminal of comparator 28. The output signal from the AND gate 54 is transmitted through the OR gate 56 to actuate the solenoid 58, thereby initiating a brake pressure decay, which is terminated when the wheel reaccelerates above the reference level 52, or when the value of the signal on the output terminal 26 of the reference velocity circuit 24 drops below the reference value 30.

If one of the wheels 16 or 18 begins rotating more slowly than its corresponding reference level 60 or 64, OR gate 66 generates an output signal which is fed to one of the input terminals of the AND gate 70. AND gate 70 thereupon generates an output signal, if the value of the signal on the terminal 26 of the reference velocity circuit 24 is greater than the reference level 37. The output of the AND gate 70 is fed through OR gate 56 to actuate the solenoid 58 to thereby initiate a brake pressure decay. The decay is terminated when the timer 68 times out or when the value of the signal on terminal 26 drops below the reference level 37, or when the speed of both of the wheels increases above their corresponding reference levels 60 and 64.

If the rotational velocities of both of the wheels 16 and 18 drop below their corresponding reference levels 60 and 64, one-shot 74 is fired, and AND gate 76 produces an output pulse if the value of the signal on output terminal 26 of the reference velocity circuit 24 is greater than the reference level 37. The output pulse of AND gate 76 resets the flip flop 110 and sets flip flop 78, thereby declaring the secondary mode. The output of the flip flop 78 is fed through the OR gate 56 and actuates the solenoid 58. The flip flop 78 is reset, to thereby terminate the brake pressure decay, by circuitry generally indicated by the numeral 80 which is designed to determine when the corresponding wheel has recovered sufficiently that it is rotating substantially synchronous with the vehicle velocity. Flip flop 78 is reset when the value of the acceleration signal generated by the differentiator 40 exceeds the reference value 84. The flip flop 78 is also reset when the peak fall-off detector 90 generates an output signal. This occurs when the value of the acceleration signal generated by differentiator 40 decreases a predetermined amount from its peak value, provided that the then current value of the acceleration signal is still greater than zero. Flip flop 78 is also reset when the value of the acceleration signal generated by the differentiator 40 drops below the reference value 108 for a time period at least equal to that of the timer 114. Of course, before termination can be effective by the timer 114, the value of the acceleration signal must first increase above the reference value 108 from a value less than that value. Finally, flip flop 78 may be reset by the timer 116. This occurs a predetermined time period after the solenoid 58 is initially actuated, but the timer 116 is reset when the value of the acceleration signal generated by the differentiator 40 initially increases above the reference value 108, to allow an additional time period for possible termination by the timer 114.

We claim:

1. In a vehicle having an axle, a pair of wheels rotatable on said axle, and fluid pressure operated brake means controlling each of said wheels, an adaptive braking system to control actuation of said brake means comprising:
    means for generating a first signal proportional to the rotational velocity of one of said wheels and a second signal proportional to the rotational velocity of the other wheel;
    means for comparing each of said first and second signals to corresponding wheel reference signals having predetermined reference values and generating a third signal if the value of both of said first and second signals is less than the value of the corresponding wheel reference signal;
    means responsive to one of said first and second signals for generating a fourth signal substantially proportional to a vehicle velocity;
    means for comparing the value of said fourth signal with a vehicle velocity reference signal having a predetermined value and generating a fifth signal when the value of said fourth signal exceeds the value of said vehicle reference signal;
    means responsive to simultaneous generation of said third and fifth signals for effecting a brake pressure reduction;
    means for sensing rotation of the wheel corresponding to said one signal synchronous with vehicle speed and generating a sixth signal in response thereto;
    said means for effecting a brake pressure reduction terminating said brake pressure reduction upon generation of said sixth signal.

2. The invention of claim 1:
    said means for generating said fourth signal including means responsive to said one signal of said first and second signals for generating a signal decaying at a substantially constant rate when said one signal decreases at a rate greater than said predetermined rate, said decaying signal being said fourth signal.

3. Th invention of claim 2:
    means for differentiating said one signal to generate an acceleration signal proportional to acceleration of said one wheel;
    said means for sensing synchronous speed of said one wheel with the speed of the vehicle including means responsive to the peak value of said acceleration signal and means for generating said sixth signal when said acceleration signal decreases a predetermined amount from said peak value if the value of said acceleration signal is greater than zero after said signal has decreased said predetermined amount.

4. The invention of claim 3:
    said means for sensing synchronous speed of said one wheel with the speed of the vehicle including means for comparing said acceleration signal with a first acceleration reference signal and generating said sixth signal when the value of said acceleration signal is greater than the value of said first acceleration reference signal.

5. The invention of claim 4:
    said means for sensing synchronous speed of said one wheel with the spedd of the vehicle including means for comparing said acceleration signal with a second acceleration reference signal corresponding with an acceleration reference level slightly greater than zero acceleration, and generating said sixth signal when the acceleration signal remains below said second acceleration reference level for a predetermined time period after increasing above said reference level. speed 6. The invention of claim 5; and
    timing means responsive to initiation of a brake pressure reduction for limiting the duration of said brake pressure reduction to a predetermined time period, and means for resetting said timing means upon termination of said brake pressure reduction and upon initial increase of said acceleration signal above said second acceleration reference level.

7. The invention of claim 2:
    said means for sensing synchronous speed of said one wheel with th speed of the vehicle including means for comparing said acceleration signal with a second acceleration reference signal corresponding with an acceleration reference level slightly greater than zero acceleration, and generating said sixth signal when the acceleration signal remains below said second acceleration reference level for a predetermined time period after increasing above said reference level.

8. The invention of claim 7:
    timing means responsive to initiation of a brake pressure reduction for limiting the duration of said brake pressure reduction to a predetermined time period, and means for resetting said timing means upon termination of said brake pressure reduction and upon initial increase of said acceleration signal above said second acceleration reference level.

9. The invention of claim 2; and
    means for differentiating said one signal to generate a signal proportional to acceleration and deceleration of the corresponding wheel;
    means for generating a pair of acceleration and deceleration reference levels;
    means for generating a seventh signal when the signal proportional to an acceleration and deceleration of the corresponding wheel drops below a reference level and terminating the seventh signal when the signal proportional to acceleration and deceleration of the corresponding wheel increases above the other reference levels;

means for generating a second vehicle reference signal proportional to a vehicle velocity greater than the first vehicle reference velocity;

means for comparing said fourth signal with said second vehicle reference signal and generating an eighth signal when the value of the fourth signal is greater than the value of said second vehicle reference signal;

said means for effecting a brake pressure reduction being further responsive to simultaneous generation of said seventh and eighth signals to effect a brake pressure reduction.

10. In a vehicle having an axle, a pair of wheels rotatable on said axle, and fluid pressure operated brake means controlling each of said wheels, an adaptive braking system to control actuation of said brake means comprising:

means for generating a first signal proportional to the rotational velocity of one of said wheels and a second signal proportional to the rotational velocity of the other wheel;

means for comparing each of said first and second signals to corresponding wheel reference signals having a predetermined value and generating a third signal when the value of either of said first and second signals drops below the value of its corresponding wheel reference signal;

means responsive to one of said first or second signals for generating a fourth signal approximately proportional to vehicle velocity;

means for comparing the value of said fourth signal with a vehicle reference signal having a predetermined value and generating a fifth signal when the value of the fourth signal exceeds the value of said vehicle reference signal;

means responsive to simultaneous generation of said third and fifth signals for effecting a brake pressure reduction and terminating said brake pressure reduction upon termination of either of said third and fifth signals.

11. The invention of claim 10:

said means for generating said fourth signal including means responsive to said one signal of said first and second signals for generating a signal decaying at a substantially constant rate when said one signal decreases at a rate greater than said predetermined rate, said decaying signal being said fourth signal.

12. The invention of claim 11; and timing means for terminating said brake pressure reduction a predetermined time after said brake pressure reduction is initiated.

13. The invention of claim 11:

said one of said first or second signals being the signal proportional to the faster rotating wheel.

* * * * *